June 30, 1953  E. M. BOARDMAN ET AL  2,644,122
CAPACITOR
Filed May 17, 1950

INVENTORS: E. M. BOARDMAN
M. C. WOOLEY
BY D. MacKenzie
AGENT

Patented June 30, 1953

2,644,122

UNITED STATES PATENT OFFICE 2,644,122

CAPACITOR

Edward M. Boardman, Mountain Lakes, and Merwyn C. Wooley, Chatham, N. J., assignors to Bell Telephone Laboratories, Incorporated, New York, N. Y., a corporation of New York Application May 17, 1950, Serial No. 162,568

1 Claim. (Cl. 317—256)

This invention relates to electrical condensers and is especially applicable to a tubular condenser centrally enclosing a resistance unit electrically associated in series or in parallel with the condenser.

Tubular condensers are commonly wound on an arbor from which the completed condenser is removed. A disadvantage of this construction is that the inner turns of the condenser are left without support so that when the unit is dried and the dielectric material shrinks, there is a pressure radially inward which collapses the inner turns. The resulting creases or wrinkles in the collapsed turns impair the condensing stability in capacitance and its ability to withstand high voltage.

One object of the invention is to provide a tubular condenser in which structural distortion on aging is precluded.

In the present invention, the above-noted disadvantage is avoided by using an arbor of suitable material, such as a tube of plastic or metal, which may be left in place in the completed condenser without disadvantage to the electrical properties thereof.

For high voltage condensers in which the dielectric, commonly paper, is saturated with oil, it is desirable to have in the containing case enough oil at normal temperature to maintain this saturation when the oil volume shrinks with cooling to a low temperature. The space in the container allotted for the reserve oil is useless electrically. It is desirable to reduce this space as far as practicable. In the condenser hereinafter described, the tubular arbor is available and is used as part of the oil reservoir. It is possible to make this any part or all of the total volume required to accommodate the necessary oil, thereby to that extent reducing the space within the container above the end of the unit.

Another object of the invention is thus to minimize the electrically dead space necessary to provide in the containing case of a tubular condenser.

Further, the effect of radial pressure on the inner turns as they are compressed against the supporting arbor in consequence of dielectric shrinkage is made harmless by providing a cushion of several layers of dielectric material wound on the arbor before the turns of the condenser proper are wound outside them. This cushion reduces the risk of dielectric failure of the inner turns of the condenser winding.

Therefore, another object of the invention is to provide a tubular condenser centrally supported against structural distortion and with its inner turns protected by an electrically inactive cushion embracing the supporting member.

A feature of the condenser construction herein described is that the supporting arbor may be used to house a resistance unit connected to the condenser within the case and, through the cover of the case, to an external circuit.

A further object of the invention then is to provide a condenser-resistance unit within a common case.

The invention will be understood from the following description of a preferred embodiment thereof, read in connection with the accompanying drawing, in which.

Figure 1:
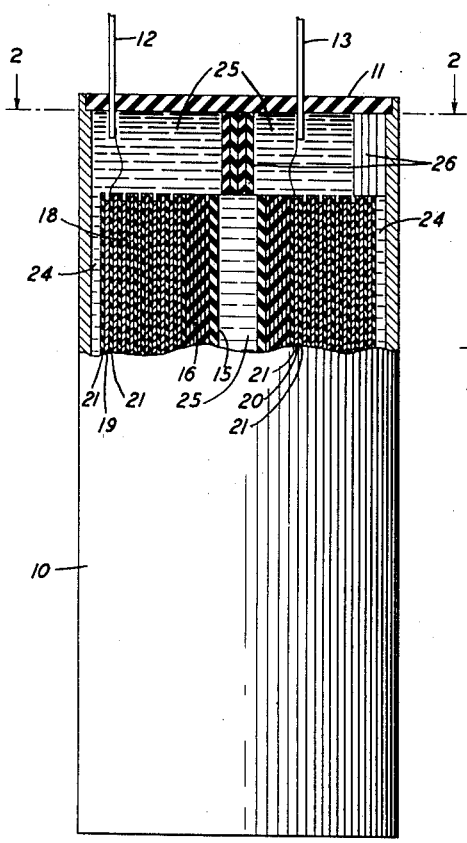
Fig. 1 is a vertical section, partly broken away, of a tubular condenser illustrative of one embodiment of the invention.
Figure 2:
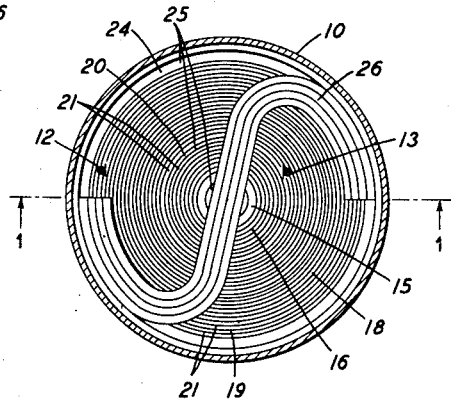
Fig. 2 is a horizontal section taken at the line 2—2 of Fig. 1 in the direction of the arrows.

Referring to Fig. 1, 10 indicates the containing case, for example, of suitable metal, closed at the top by an insulating cover 11 through which electrodes 12 and 13 may be extended for connection to an external circuit. Within case 10 are located hollow arbor 15, of suitable material, on which have been wound in the conventional manner a small plurality 16 of turns of dielectric material, paper, for example, to form a cushion between arbor 15 and condenser 18 proper. Condenser 18 is conventionally constituted and is wound about dielectric turns 16. Terminals 12 and 13 are taken from appropriate points on the electrode layers 19 and 20 separated by dielectric 21. The turns of condenser 18 may be as many as required to provide the desired capacitance. The width and outer radius of the condenser turns are somewhat less than the axial extent and inner radius of case 10 below cover 11 leaving a space 24, which is filled with oil 25, as is also the interior of arbor 15. A number of layers 26 of stiff insulating material, better shown in Fig. 2, are formed into an S-shaped spacer between the upper end of condenser 18 and the under surface of cover 11. Arbor 15 is preferably supported by any convenient means above the bottom of case 10 to allow free oil circulation.

It will be noted that the peripheral shrinkage due to age and drying of the dielectric turns between electrode layers 19 and 20 will be prevented from collapsing inwardly by arbor 15, and the compressibility of the electrically inert turns 16 will shield from radial pressure damage the condenser turns immediately surrounding them.

Figure 3:
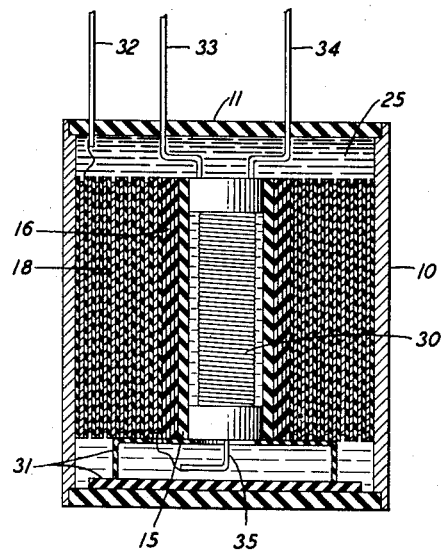
Fig. 3 is a view, partly in section, of a tubular condenser central in which is a resistance unit.

The combination with a wound resistance unit of a tubular condenser, such as described in the foregoing discussion of Fig. 1, is shown in Fig. 3. Here, resistance unit 30 is located within arbor 15 and rests on a suitable base 31, bottomed in case 10, which also supports arbor 15 and condenser 18, with the inner protecting turns 16. This base replaces in part spacing layers 26, which are omitted from the showing of Fig. 3 for the sake of clarity. Terminal 32 is brought out from the proper place on condenser 18, terminals 33 and 34 from the ends of unit 30. In the illustrative example of Fig. 3, one electrode of condenser 18 is connected by conductor 35 to a point on resistance 30, while the other electrode of the condenser and the ends of unit 30 are brought out to terminals 32, 33, and 34, respectively.

It will be understood that by known procedure, there may be wound on arbor 15 a plurality of distinct capacitances, with exterior terminals as desired, and that inductances as well as resistances may be installed within arbor 15.

What is claimed is:

An electrical condenser comprising a tubular condenser unit including alternate turns of conductive and of dielectric material wound into a cylinder, a tubular, axial support of insulation within the cylinder, and cushioned layers of dielectric material between the cylinder and the coaxial support; a cylindrical container for said unit of greater axial and radial extent than the unit, spacing means between the ends of the container and the respective ends of the condenser unit, one of said spacing means comprising a flat, laminated, convoluted member of insulation, and a liquid dielectric in the voids of the condenser unit, the spacers, and the container.

EDWARD M. BOARDMAN.
MERWYN C. WOOLEY.

References Cited in the file of this patent

UNITED STATES PATENTS

| Number | Name | Date |
| --- | --- | --- |
| 1,324,792 | Booth | Dec. 16, 1919 |
| 1,536,948 | Thomson | May 5, 1925 |
| 1,671,478 | Marbury | May 29, 1928 |
| 1,775,266 | Bailey | Sept. 9, 1930 |
| 2,424,904 | Ruben | July 29, 1947 |

FOREIGN PATENTS

| Number | Country | Date |
| --- | --- | --- |
| 235,769 | Great Britain | June 25, 1925 |
| 371,057 | Great Britain | Apr. 21, 1932 |